United States Patent
Hori et al.

(10) Patent No.: US 6,496,316 B1
(45) Date of Patent: Dec. 17, 2002

(54) MAGNETIC RECORDING AND REPRODUCTION APPARATUS

(75) Inventors: Yosuke Hori, Hiratsuka (JP); Yasuhide Ouchi, Odawara (JP); Naoki Satoh, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/721,988

(22) Filed: Nov. 27, 2000

Related U.S. Application Data

(63) Continuation of application No. 09/435,779, filed on Nov. 8, 1999, now Pat. No. 6,175,460, which is a continuation of application No. 08/529,400, filed on Sep. 18, 1995, now Pat. No. 6,046,873.

(30) Foreign Application Priority Data

Sep. 20, 1994 (JP) .............................. 6-224509

(51) Int. Cl.[7] .............................. G11B 5/035; H04B 1/10
(52) U.S. Cl. .............................. 360/65; 360/53; 375/350
(58) Field of Search .............................. 360/65, 46, 53; 375/232, 350

(56) References Cited

U.S. PATENT DOCUMENTS

| | | | | |
|---|---|---|---|---|
| 3,774,154 A | * | 11/1973 | Devore et al. ............... | 714/769 |
| 3,868,576 A | | 2/1975 | Bagdasarjanz et al. ..... | 375/230 |
| 5,179,575 A | | 1/1993 | Pierce et al. ................. | 375/232 |
| 5,274,512 A | * | 12/1993 | Tanaka et al. ................ | 360/65 |
| 5,341,387 A | | 8/1994 | Nguyen ....................... | 714/788 |
| 5,422,760 A | | 6/1995 | Abbott et al. ................ | 360/46 |
| 5,432,794 A | | 7/1995 | Yaguchi ....................... | 714/708 |
| 5,585,974 A | * | 12/1996 | Shrinkle ....................... | 360/46 |
| 5,588,011 A | | 12/1996 | Riggle ......................... | 714/792 |
| 5,745,315 A | * | 4/1998 | Aoyama ....................... | 360/65 |
| 5,761,212 A | | 6/1998 | Foland et al. ................. | 714/719 |
| 5,954,837 A | * | 9/1999 | Kim ............................. | 714/795 |
| 6,175,460 B1 | * | 1/2001 | Hori et al. .................... | 360/53 |
| 6,313,961 B1 | * | 11/2001 | Armstrong et al. ........... | 360/46 |

FOREIGN PATENT DOCUMENTS

JP          3-144969          6/1991

* cited by examiner

*Primary Examiner*—David Hudspeth
*Assistant Examiner*—Dan I. Davidson
(74) *Attorney, Agent, or Firm*—Mattingly, Stanger & Malur, P.C.

(57) ABSTRACT

A magnetic recording and reproduction apparatus, includes a circuit for changing a reference amplitude value of a Viterbi detector. The circuit is used to record and reproduce data with the reference amplitude value displaced from a reference value, thereby measuring the data error rate. Displacement of the reference amplitude from a reference value increases the data error rate, and therefore the data error rate can be measured within a short time. A data error rate with the reference amplitude equal to a reference value is estimated from the data error rate measurement, thereby making it possible to evaluate the degree of accuracy of a magnetic recording and reproduction apparatus. The data error rate is measured with the reference amplitude of the Viterbi detector displaced from a reference value while changing the equalization coefficient value of a waveform equalizer, the cut-off frequency of a low-pass filter and the write precompensation amount of a write precompensation circuit. In this way, the effect of the reproduction channel parameter or the write precompensation amount on the degree of accuracy of the magnetic recording and reproduction apparatus is evaluated, and the optimum value of the reproduction channel parameter or the write precompensation amount can thus be determined.

1 Claim, 8 Drawing Sheets

MAGNETIC RECORDING AND REPRODUCTION APPARATUS

This is a continuation application of U.S. Ser. No. 09/435,779, filed Nov. 8, 1999, now U.S. Pat. No. 6,175,460 which is a continuation application of U.S. Ser. No. 08/529,400, filed Sep. 18, 1995, now U.S. Pat. No. 6,046,873.

BACKGROUND OF THE INVENTION

1. Field of the Invention

The present invention relates to a magnetic recording and reproduction apparatus, and more particularly to a magnetic recording and reproduction apparatus having means for evaluating the degree of data accuracy and means for detecting a fault to assure the quality of the apparatus.

2. Description of the Related Art

A magnetic recording and reproduction apparatus having a Viterbi detector is described in IEEE Transactions on Magnetics, Vol. 27, pp. 4538–4543.

This magnetic recording and reproduction apparatus is made up of a write precompensation circuit for correcting a bit shift which is generated at the time of reproduction, a low-pass filter for removing high-frequency noise components of an analog reproduction waveform signal read from a magnetic recording medium, an A/D converter for converting the analog reproduction waveform signal into a digital waveform signal, a waveform equalizer for shaping the digital waveform signal, and a Viterbi detector for identifying digital data from the shaped ditigal waveform signal. In this apparatus, a recording-reproduction signal processing circuit is contained in a one-chip LSI (Large Scale Integrated Circuit) to meet requirements for reduction in size and increase in data transfer rate.

A criterion for deciding the quality of a magnetic recording and reproduction apparatus is the degree of data accuracy. The degree of data accuracy is dependent on the recording-reproduction channel parameters such as the amount of write precompensation of the write precompensation circuit, the cut-off frequency of the low-pass filter, and the equalization coefficient value of the waveform equalizer, as well as the electromagnetic conversion characteristics of a magnetic head and a magnetic medium. For producing a magnetic recording and reproduction apparatus of high quality, these parameters are required to be set to optimum values at the time of using the apparatus. In order to determine the optimum value of these parameters, on the other hand, the degree of data accuracy is required to be evaluated quantitatively at the time of parameter variations.

Generally, an error rate is used as a numerical value for quantifying the degree of data accuracy. When a magnetic recording and reproduction apparatus is being used under normal operating conditions, however, the error rate is so small that the measurement of the error rate requires a great amount of time, thereby making it difficult to decide the quality of the apparatus accurately.

JP-A-3-144969 discloses a technique in which the degree of data accuracy is evaluated by comparing the series of a digital waveform signal with the series of a reference signal, measuring the histogram of the resulted error value, and thus predicting the data error rate of the magnetic recording and reproduction apparatus.

On the other hand, as a conventional method of evaluating the degree of data accuracy, a level margin test is known. In the level margin test, a gate slice level to be compared with the amplitude of an output signal of the waveform equalizer is moved vertically, and by detecting missing bits or extra bits, the margin width of the gate slice level and the data error rate are measured.

SUMMARY OF THE INVENTION

The method of predicting an error rate by histogram measurement, however, emphasizes only the distribution of a digital waveform signal and fails to incorporate the data identification characteristics of the Viterbi detector for estimating a series of maximum likelihood values. The level margin test, which detects a level for each bit, also does not incorporate the data identification characteristics of a Viterbi detector for estimating a series of maximum likelihood values. For these reasons, the conventional methods of evaluating the degree of data accuracy cannot correctly evaluate the performance of the recording-reproduction channel including the Viterbi detector.

In the case where a recording-reproduction signal processing circuit is built in an LSI chip, it is not easy to detect an optimum value of a parameter unless the same chip includes means for evaluating the dependency of the magnetic recording and reproduction apparatus on the recording-reproduction channel parameters. Further, it is also not easy to determine the quality of the magnetic recording and reproduction apparatus.

An object of the invention is to provide a magnetic recording and reproduction apparatus having a Viterbi detector capable of evaluating the degree of data accuracy of the apparatus.

Another object of the invention is to provide a magnetic recording and reproduction apparatus capable of evaluating the degree of data accuracy of the apparatus by changing the circuit characteristics of the apparatus.

Still another object of the invention is to provide a magnetic recording and reproduction apparatus capable of measuring the data error rate in accordance with a predetermined sequence.

In order to achieve these objects, according to one aspect of the invention, there is provided a magnetic recording and reproduction apparatus made up of a data generator for generating write data, a write precompensation circuit for correcting the phase of the write data signal generated from the data generator, and a magnetic head for electromagnetically converting the write data signal corrected by the write precompensation circuit, a magnetic disc moved relatively with the magnetic head for recording and reproducing a signal through the magnetic head, a read-write amplifier amplifies the signal recorded in the magnetic head and read from the magnetic head, and an AGC circuit keeps constant the amplitude of the output signal of the read-write amplifier. The apparatus further includes a low-pass filter for removing the high-frequency noise components of the output signal of the AGC circuit, an A/D converter for sampling the output signal of the low-pass filter and converting it into a multi-valued digital value, a waveform equalizer for shaping the digital signal converted by the A/D converter, and a VFO circuit for producing a sample clock of the A/D converter, A Viterib detector identifies the output signal of the waveform equalizer by two threshold values and produces read data based on the sample clock. The apparatus further employs and means for changing the reference amplitude value providing the threshold level of the Viterbi detector, means for comparing the write data and the read data, and means for detecting an error, wherein data is recorded and reproduced with the reference amplitude value changed. The degree of data accuracy of the magnetic recording and reproduction apparatus is evaluated according to the data error rate of the apparatus which was measured by changing the reference amplitude value of the Viterbi detector.

According to another aspect of the invention, there is provided a magnetic recording and reproduction apparatus wherein a signal processing LSI has a function such that at least an input pin of the LSI is designated, through which the reference amplitude value of the Viterbi detector is changed.

According to still another aspect of the invention, there is provided a magnetic recording and reproduction apparatus which has the function of changing the cut-off frequency of a low-pass filter, the equalization coefficient value of a waveform equalizer and the reference amplitude value of a Viterbi detector. The degree of data accuracy of the magnetic recording and reproduction apparatus is evaluated by measuring the data error rate when the reference amplitude value of the Viterbi detector is displaced from a reference value while changing the cut-off frequency of the low-pass filter and the equalization coefficient value of the waveform equalizer.

According to a further aspect of the invention, there is provided a magnetic recording and reproduction apparatus which has the function of changing the amount of write precompensation of a write precompensation circuit and the reference amplitude value of a Viterbi detector. While changing the write precompensation amount of the write precompensation circuit, the data error rate is measured with the reference amplitude value of the Viterbi detector displaced from a reference value. Thus the degree of data accuracy of the magnetic recording and reproduction apparatus is evaluated.

According to a still further aspect of the invention, there is provided a magnetic recording and reproduction apparatus wherein the write precompensation amount of a write precompensating circuit, the cut-off frequency of a low-pass filter, the equalization coefficient value of a waveform equalizer, and the reference amplitude value of a Viterbi detector are set automatically in accordance with a sequence predetermined by a coefficient setting sequencer.

According to a yet further aspect of the invention, there is provided a magnetic recording and reproduction apparatus wherein the degree of data accuracy of the apparatus is evaluated by measuring the magnitude of a signal obtained by averaging the absolute value or the square value of the waveform equalization error.

According to the present invention, the data identification performance can be deteriorated while maintaining the identification characteristics of a Viterbi detector of the magnetic recording and reproduction apparatus by displacing the reference amplitude value of the Viterbi detector from a reference value. As a result, a data error occurs with an increasing frequency, thereby making it possible to measure the data error rate within a short length of time. The data error rate inherent to the apparatus, i.e., the degree of data accuracy of the apparatus, can thus be predicted from the particular data error rate.

Further, the signal processing LSI has the function of changing the reference amplitude value of a Viterbi detector through an input pin of the LSI. As a result, the degree of data accuracy of the apparatus can be easily evaluated with an LSI built in the apparatus.

Furthermore, the data error rate is measured with the cut-off frequency of a low-pass filter and the equalization coefficient value of a waveform equalizer changed while displacing the reference amplitude value of a Viterbi detector from a reference value. The effect of a change in the reproduction channel parameter on the data accuracy is evaluated, and an optimum value of the parameter can thus be determined.

In addition, according to the invention, the effect of a change in the amount of write precompensation on the degree of data accuracy can be evaluated by changing the write precompensation amount of the write precompensation circuit of the magnetic recording and reproduction apparatus and measuring the data error rate with the reference amplitude value of the Viterbi detector displaced from a reference value, thereby determining an optimum value of the write precompensation amount.

Also, the magnetic recording and reproduction apparatus according to the invention has the function of automatically setting the cut-off frequency of the low-pass filter, the equalization coefficient value of the waveform equalizer and the reference amplitude value of the Viterbi detector in accordance with a sequence predetermined by a coefficient setting data sequencer. As a result, the degree of data accuracy can be easily evaluated while setting the coefficient automatically in accordance with a predetermined sequence without using any external devices such as a controller.

What is more, the data identification performance of the recording-reproduction channel can be approximately grasped by monitoring the signal representing the average of the absolute value or the square value of the waveform equalization error. As a consequence, the result of a quality assurance test of a product and the chronological change of the recording-reproduction channel including the head disc when being used by the user after the product shipment can be determined.

DESCRIPTION OF THE PREFERRED EMBODIMENTS

An embodiment of a magnetic recording and reproduction signal processing circuit according to the present invention will be described below with reference to the accompanying drawings.

Figure 1:
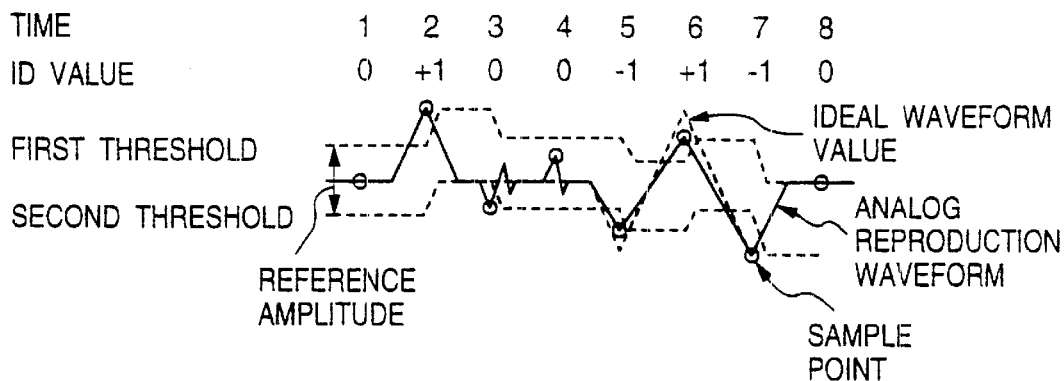
FIG. 1 is a diagram showing the operation for Viterbi detection with the reference amplitude value providing a reference value.
Figure 2:
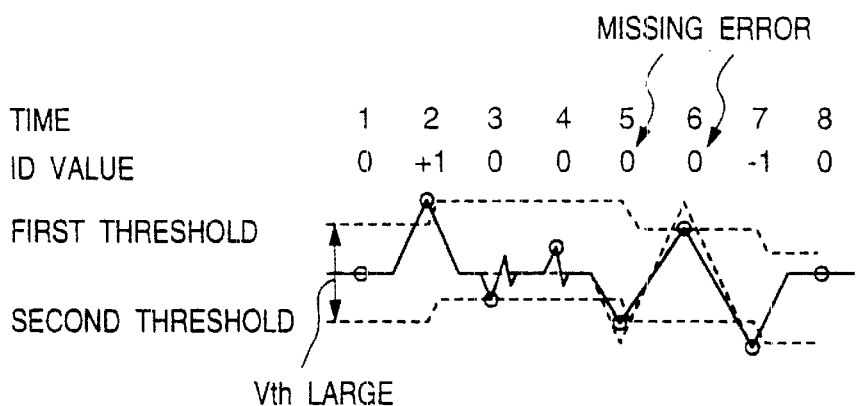
FIG. 2 is a diagram showing the operation with the reference amplitude value of the Viterbi detector increased above a reference value.
Figure 3:
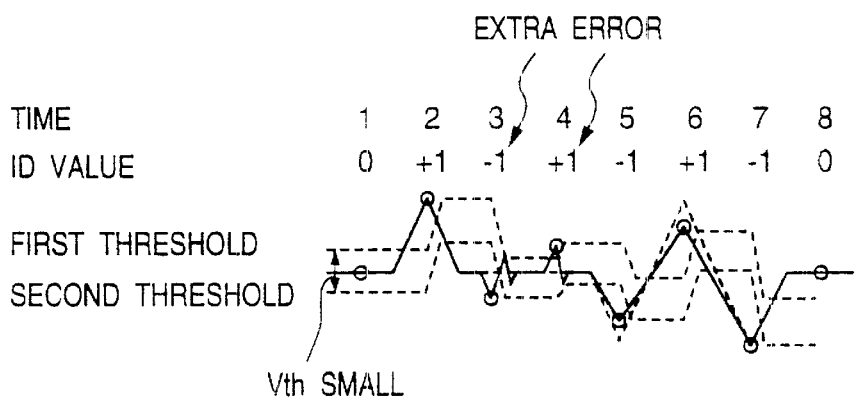
FIG. 3 is a diagram showing the operation with the reference amplitude value of the Viterbi detector decreased below a reference value.
Figure 4:
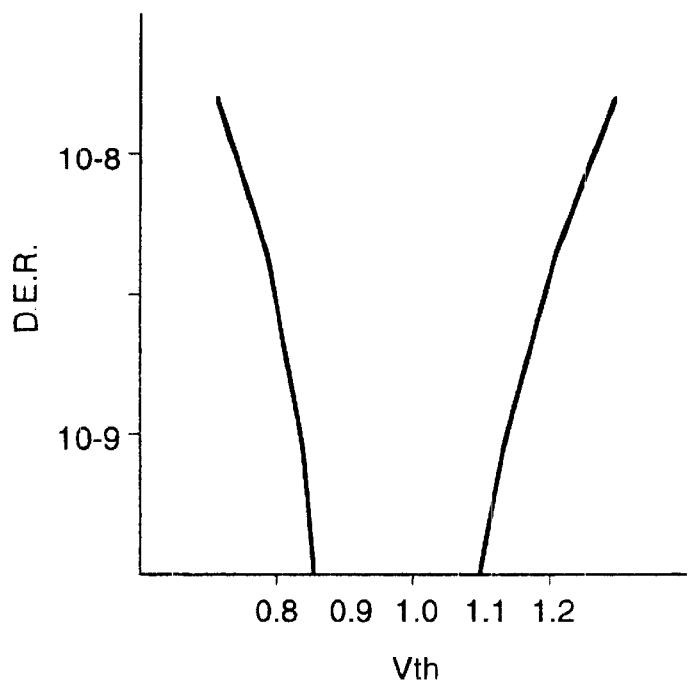
FIG. 4 is a diagram showing the relation between the reference amplitude value and the data error rate of a Viterbi detector.

FIG. 1 is a diagram showing the operation of the Viterbi detector, FIG. 2 is a diagram showing the operation with the reference amplitude value of the Viterbi detector increased above a reference value, FIG. 3 is a diagram showing the operation with the reference amplitude value of the Viterbi detector decreased below a reference value, and FIG. 4 is a diagram showing the relation between the reference amplitude value of the Viterbi detector and the data error rate. The analog reproduction waveform in FIG. 1 is a waveform input to an A/D converter, and the sample point is a value converted into a digital value by being sampled at an A/D converter and equalized by a waveform equalizer.

In the Viterbi detector, a series of maximum likelihood values are estimated by moving two threshold values as shown in FIG. 1 in accordance with a series of sample values. The sample value inserted between the two threshold values is identified as data "0". A sample datum value larger than the first threshold value becomes a candidate for data "1", and the sample value smaller than the second threshold value a candidate for data "−1". In the case of a series where the candidates for data "1" and data for "−1" appear alternately, data as a candidate become the direct result of identification. In the case where candidates of the same polarity successively appear, only the rear candidate remains as the result of identification, while the front candidate is identified as "0".

The interval between the two threshold values of the Viterbi detector (reference amplitude value: Vth) is usually the same as the expected value of the input waveform amplitude. As shown in FIG. 2, however, an interval larger than the expected value increases the missing error. When the interval is decreased below the expected value, as shown in FIG. 3, on the other hand, the extra error increases. The relation between the reference amplitude value (Vth) and the data error rate (D.E.R) is shown in FIG. 4. In FIG. 4, the ordinate represents the data error rate, and the abscissa represents the normalized reference amplitude value. The relation between the reference amplitude value (Vth) and the data error rate is expressed as a curve (bucket curve) as shown in FIG. 4. The data error inherent to the apparatus can be determined by extending the curve and estimating the data error rate for Vth=1.0.

Figure 5:
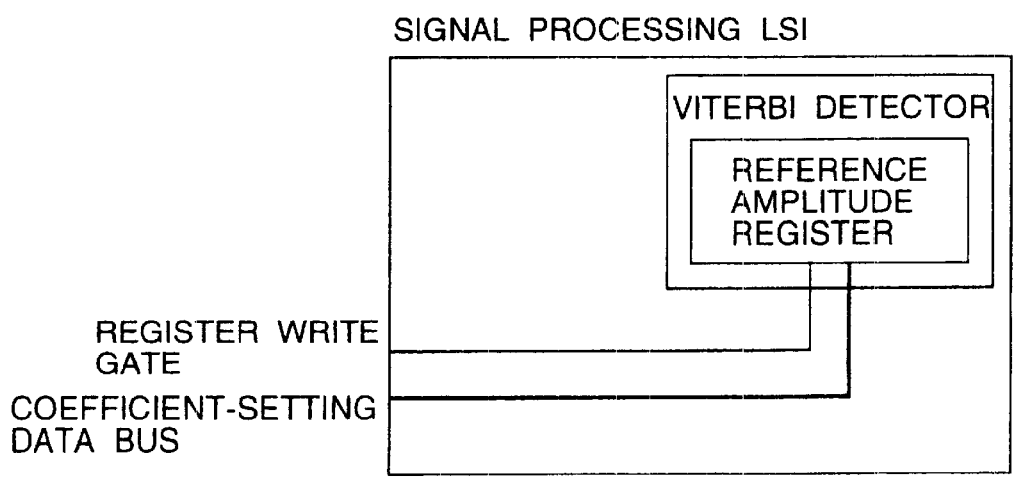
FIG. 5 is a diagram showing a signal processing LSI of a magnetic recording and reproduction apparatus having a coefficient-setting data bus.

FIG. 5 is a diagram showing a signal processing LSI of a magnetic recording and reproduction apparatus having the function of changing the reference amplitude value of a Viterbi detector through a coefficient-setting data bus. A value can be set in a reference amplitude value register of the Viterbi detector by use of the coefficient-setting data bus and a register write gate. The coefficient-setting data bus may either be in common with a setting route of registers of other parameters or be provided independently.

Figure 6:
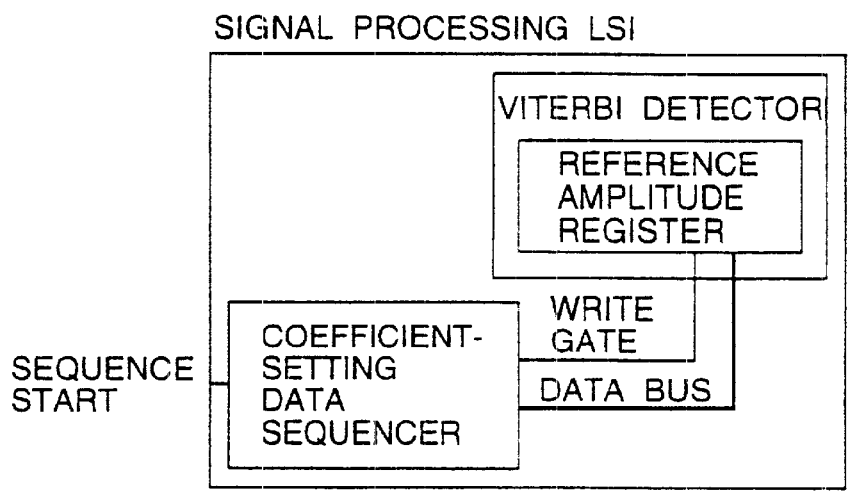
FIG. 6 is a diagram showing a signal processing LSI of a magnetic recording and reproduction apparatus having a coefficient-setting data sequencer.

FIG. 6 is a diagram showing-a signal processing LSI of a magnetic recording and reproduction apparatus having the function of changing the reference amplitude value of a Viterbi detector by a coefficient-setting data sequencer. A reference value of the Viterbi detector is set in the coefficient-setting data sequencer in advance. The sequencer is supplied with a sequence start signal and outputs reference amplitude value data for the Viterbi detector and a register write gate. The output causes the value of the reference amplitude value register of the Viterbi detector to be set. The reference amplitude value of the Viterbi detector in the coefficient-setting data sequencer may alternatively be set fixedly in the LSI. As an alternative, the reference amplitude value may be made changeable by inputting the register value in the sequencer from an external source.

Figure 8:
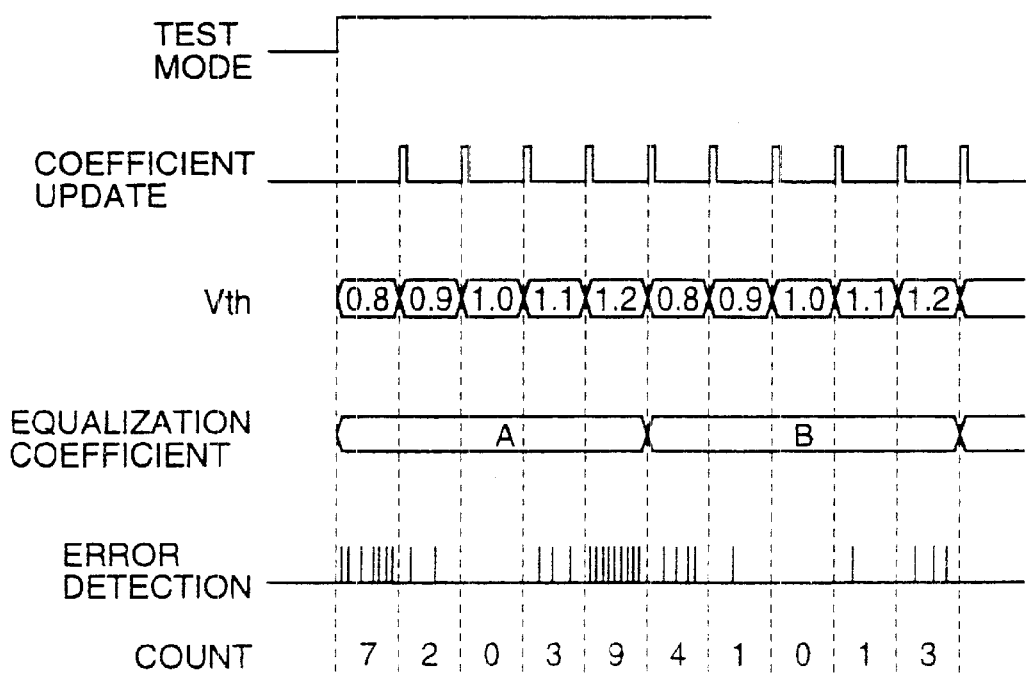
FIG. 8 is a diagram showing the signal operation of each part in a data error test conducted using the circuit of FIG. 7.
Figure 7:
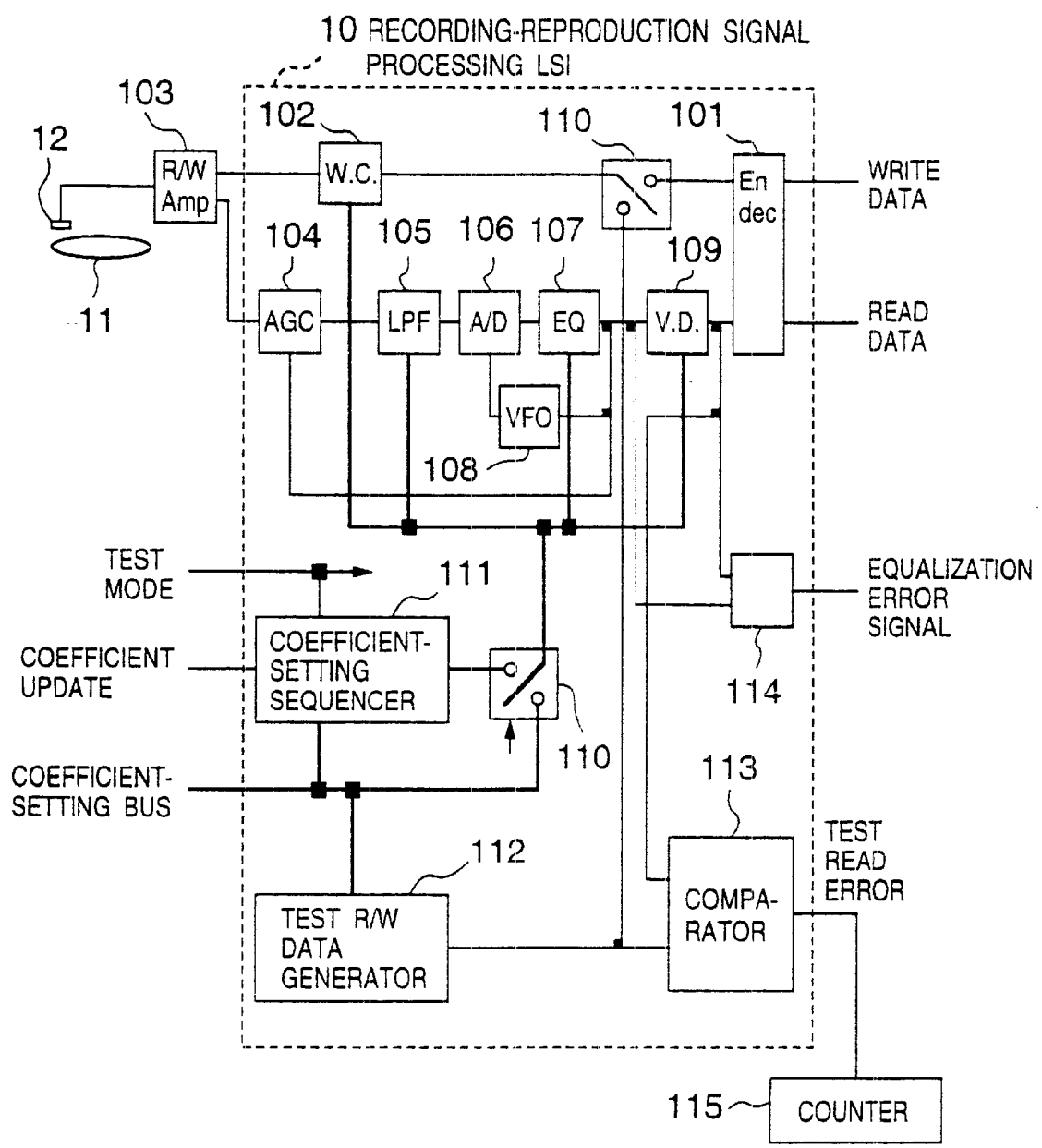
FIG. 7 is a diagram showing the main configuration of a magnetic recording and reproduction apparatus according to a first embodiment.
Figure 9:
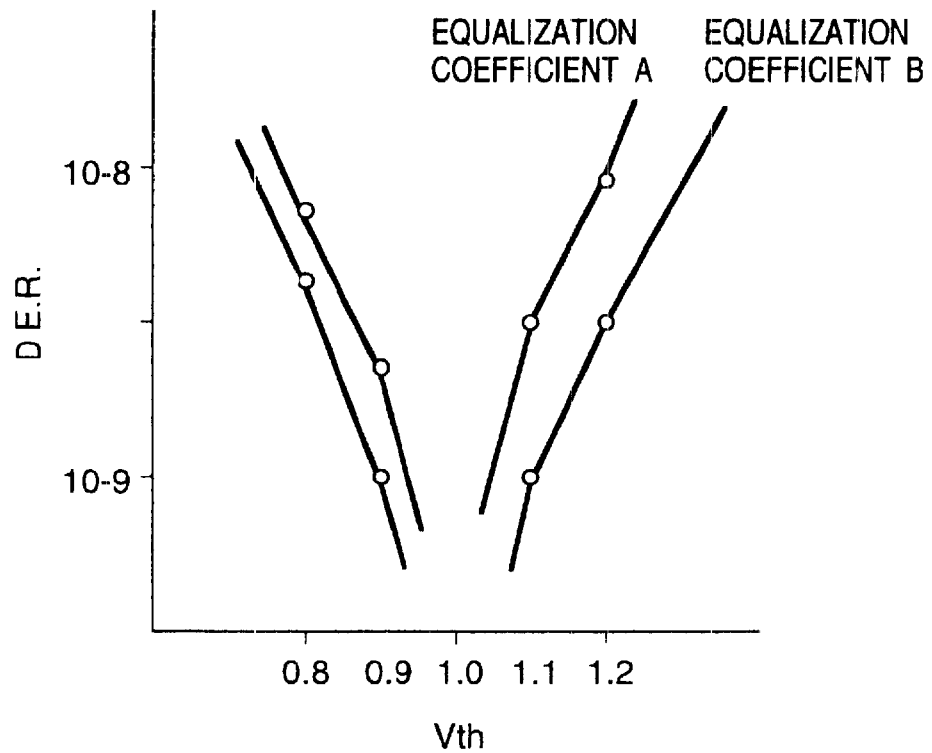
FIG. 9 is a diagram showing the result of a data error test.

FIG. 7 is a diagram showing the configuration of a magnetic recording and reproduction apparatus according to a first embodiment, FIG. 8 is a diagram showing the signal operation of each part for a data error test conducted by the use of the apparatus in FIG. 7, and FIG. 9 is a graph showing the result obtained by the data error test.

A signal processing circuit of a magnetic recording and reproduction apparatus according to the first embodiment is shown in FIG. 7. This signal processing circuit includes an encode/decode circuit 101, a write precompensation circuit 102, a read-write amplifier 103, an AGC circuit 104, a low-pass filter 105, an A/D converter 106, a waveform equalizer 107, a VFO circuit 108, a Viterbi detector 109, a switch 110, a coefficient-setting sequencer 111, a data generator 112, a data comparator 113, an equalization error signal processing circuit 114 and a counter 115.

The encode/decode circuit 101 is for converting user data into a code advantageous for recording and reproduction. The write precompensation circuit 102 is for correcting the phase of a write waveform. The data corrected by the write precompensation circuit is recorded in a magnetic recording medium 11 by a magnetic head 12 through the read-write amplifier 103. Further, the read-write amplifier 103 amplifies the analog reproduction waveform signal read by the magnetic head 12 from the magnetic recording medium 11. The AGC circuit 104 is for keeping constant the amplitude of the output waveform signal of the read-write amplifier 103.

The low-pass filter 105 is for removing high-frequency noise components of the analog reproduction waveform signal. The A/D converter 106 samples the output signal of the low-pass filter 105 and converts an analog reproduction waveform signal into a multi-valued digital signal. The waveform equalizer 107 is for shaping the digital waveform signal. The VFO circuit 108 is for generating a sample clock of the A/D converter.

The Viterbi detector 109 is for identifying data from the shaped digital waveform signal and outputs read data on the basis of the sample clock. The switch 110 is for switching the channel at the time of a data error test. The coefficient-setting sequencer 111 is for setting in a predetermined sequence the equalization coefficient value of the waveform equalizer 107, the amount of write precompensation of the write precompensation circuit 102, the cut-off frequency of the low-pass filter 105 and the reference amplitude value of the Viterbi detector 109 at the time of a data error test. The data generator 112 is for generating pattern data at the time of a test.

The data comparator 113 is for comparing the pattern data with the data identified by the Viterbi detector 109 and detecting a data read error at the time of a test. The counter 115 is for counting the number of data errors. The data generator 112 has a data register equivalent to about 36 bits and can freely set a data pattern thereof. The circuits other than the counter 115 and the read-write amplifier 103 are built in the recording-reproduction signal processing LSI 110.

In the magnetic recording and reproduction apparatus according to the first embodiment, as shown in FIG. 8, for example, at the time of a data error test (with the test mode signal of FIG. 8 at "H" level), first, the sequencer 111 sets the first coefficient values (reference amplitude value Vth= 0.8 of the Viterbi detector, and the equalization coefficient value of A), and a data read test is conducted under this condition. Then the data comparator 113 detects a data error and the counter 115 counts the number of errors. When the number of data reads reaches a predetermined number of read bits (say, $10^9$ bits), the counter 115 is reset by a coefficient update signal. Also, the coefficient setting sequencer 111 sets the second coefficient value (the reference amplitude value of the Viterbi detector Vth=0.9, and the equalization coefficient value of A), and a data read test is conducted under this condition.

The result of the data error test obtained in this way including the result with the equalization coefficient value of B is shown in FIG. 9. The ordinate of FIG. 9 represents a data error rate, and the abscissa represents the normalized reference amplitude value. The optimum coefficient value and the corresponding data error rate can be determined from this result. In the case under consideration, the equalization coefficient value B with a low data error rate is the optimum equalization coefficient value. The data error rate can be estimated by extending the curve of the equalization coefficient value B and estimating the data error rate with Vth 1.0.

Figure 10:
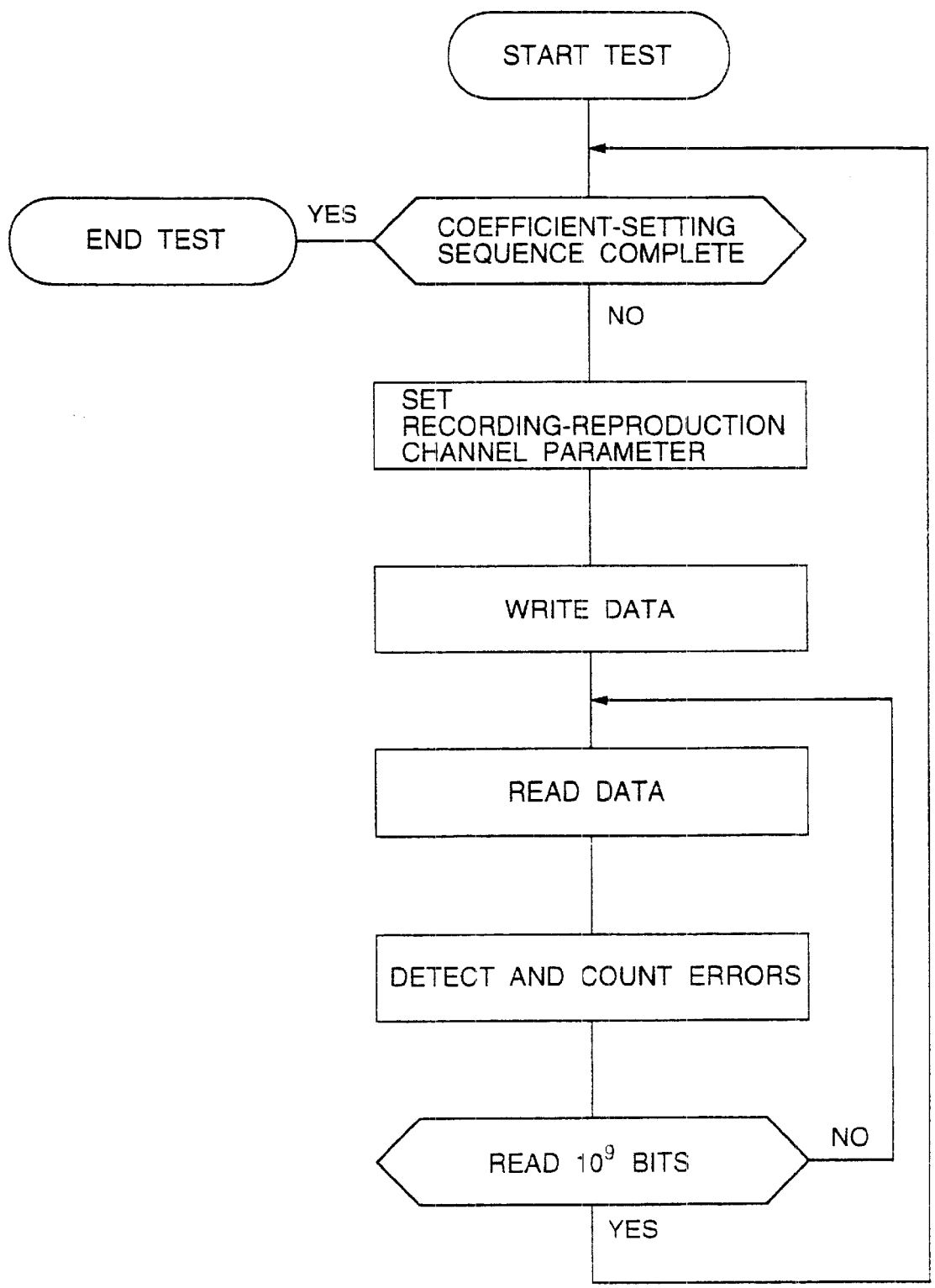
FIG. 10 is a diagram showing a flowchart of a data error test.

A flowchart for the data error test is shown in FIG. 10. First, it is decided whether the coefficient setting sequence has been completed. If the coefficient-setting sequence is completed, the test is finished. Unless the coefficient-setting sequence is completed, a recording-reproduction channel parameter is set. This step is followed by data write, data read, data read error detection and counting of the number of errors, in that order. As the next step, it is decided whether the number of data read operations has reached a predetermined number of bits (say, $10^9$ bits). Unless this number of bits is reached, the process returns to the data read operation. If the number is reached, the process is returned to the step of deciding whether the coefficient-setting sequence providing the first branching point is completed.

Figure 11:
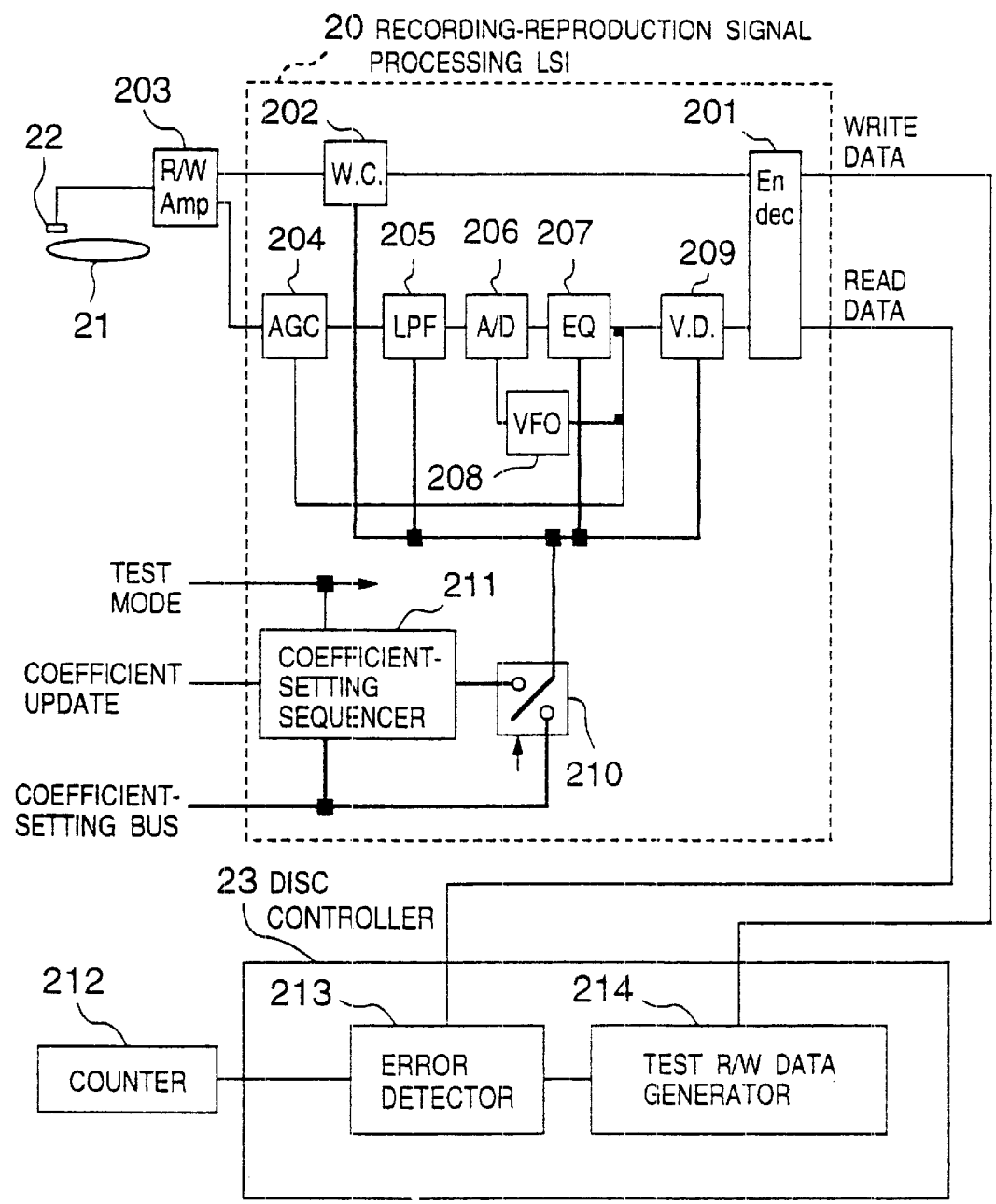
FIG. 11 is a diagram showing the configuration of a magnetic recording and reproduction apparatus according to a second embodiment of the invention.

FIG. 11 is a diagram showing the configuration of a magnetic recording and reproduction apparatus according to a second embodiment. The signal processing circuit of the magnetic recording and reproduction apparatus according to the second embodiment includes an encode/decode circuit 201, a write precompensation circuit 202, a read-write amplifier 203, an AGC circuit 204, a low-pass filter 205, an A/D converter 206, a waveform equalizer 207, a VFO circuit 208, a Viterbi detector 209, a switch 210, a coefficient-setting sequencer 211, an error detector 213, a data generator 214 and a counter 212.

The encode/decode circuit 201 is for converting user data into a code advantageous for recording and reproduction. The write precompensation circuit 202 is for correcting the phase of the write waveform. The data corrected by the write precompensation circuit is recorded in a magnetic recording medium 21 by a magnetic head 22 through the read-write amplifier 203. Further, the read-write amplifier 203 amplifies the analog reproduction waveform signal read by the magnetic head 22 from the magnetic recording medium 21. The AGC circuit 204 is for keeping constant the amplitude of the output waveform signal of the read-write amplifier 203.

The low-pass filter 205 removes high-frequency noise components of the analog reproduction waveform signal. The A/D converter 206 is for sampling the output signal of the low-pass filter and converting an analog reproduction waveform signal into a multi-valued digital signal. The waveform equalizer 207 is for shaping the digital waveform signal. The VFO circuit 208 is for generating a sample clock of the A/D converter.

The Viterbi detector 209 is for identifying data from the shaped digital waveform signal and outputting read data based on the sample clock. The switch 210 is for switching the channel at the time of a data error test. The coefficient-setting sequencer 211 is for setting the equalization coefficient value of the waveform equalizer 207, the write precompensation amount of the write precompensation circuit 202, the cut-off frequency of the low-pass filter 205 and the reference amplitude value of the Viterbi detector 209 in accordance with a predetermined sequence at the time of a data error test. The data generator 214 is for generating a data pattern at the time of a test. The data generator 214 has a data register of about 36 bits and can set the data pattern thereof freely. The error detector 213 is for detecting a data read error. The counter 212 counts the number of data errors.

According to the second embodiment, a data read error test is conducted using a disc controller 23 installed outside of the signal processing LSI 20. More specifically, the disc controller 23 instructs the signal processing LSI 20 to perform the data write and read operations. The disc controller 23 detects an error by means of an error detector 213, and the counter 212 counts the number of errors thereby to detect an error rate. The error-detecting operation of the error detector 213 may be performed either by comparison check for each bit or by checking the ECC. A test similar to that in the first embodiment can be conducted in this embodiment to produce a similar result.

Figure 12:
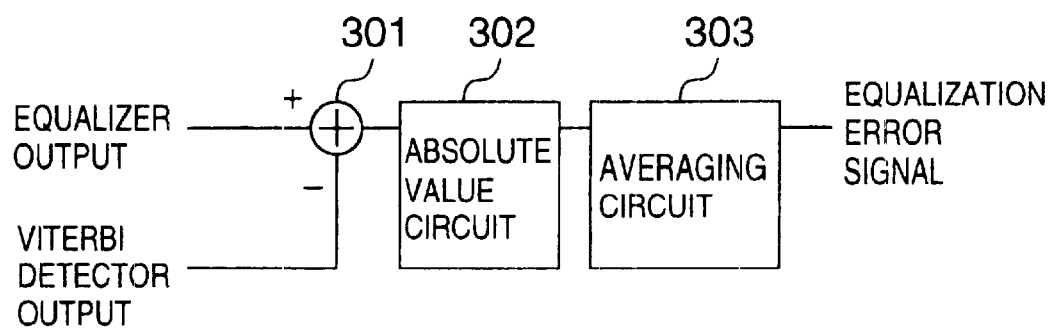
FIG. 12 is a diagram showing an example of the equalization error signal processing circuit 114 in FIG. 7.
Figure 13:
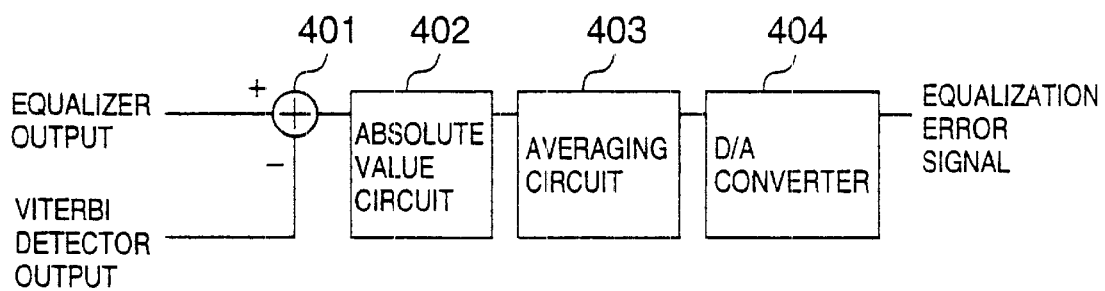
FIG. 13 is a diagram showing an example of the equalization error signal processing circuit 114 in FIG. 7
Figure 14:
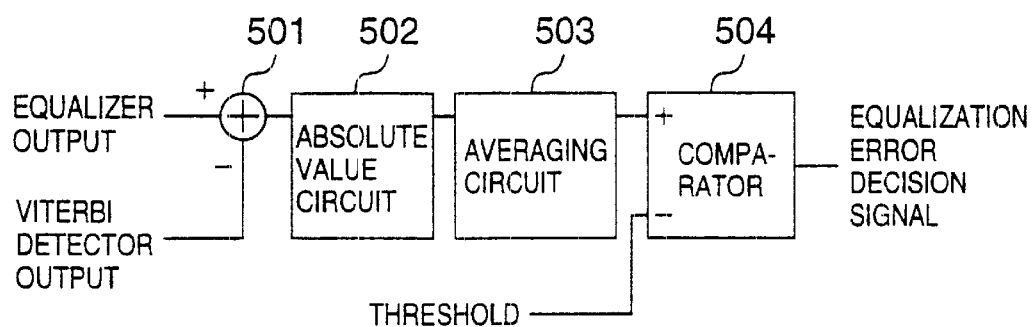
FIG. 14 is a diagram showing an example of the equalization error signal processing circuit in FIG. 7.

According to the first embodiment, a waveform sequalization error is determined, which is a difference between an actual waveform equalized by an equalizer (including nosie generated at the time of recording and reproduction) an ideal value of the waveform not including any noise. In this embodiment, the output of the Viterbi detector is assumed to be an ideal value for waveform equalization, and the difference between the equalizer output and the output of the Viterbi detector is assumed to be a waveform equalization error. The identification performance of the recording-reproduction channel of the magnetic recording and reproduction apparatus can be coarsely determined by measuring the magnitude of a signal obtained by averaging the absolute value of the waveform equalization error or the square of the waveform equalization error. The resulting identification performance can be used to decide a success or not in a product quality assurance test or to evaluate the secular variation of the recording-reproduction channel of a product in use. FIGS. 12, 13 and 14 show an example of the equalization error signal processing circuit 114 of FIG. 7.

The circuit shown in FIG. 12 includes a subtractor 301, an absolute value circuit 302 and an averaging circuit 303, and outputs a digital signal of about 6 bits.

The circuit shown in FIG. 13 includes a subtractor 401, an absolute value circuit 402, an averaging circuit 403 and D/A converter 404, and outputs a single analog signal. As compared with the circuit of FIG. 8, the circuit under consideration has the advantage that the output pins can be reduced to one.

The circuit shown in FIG. 14 includes a subtractor 501, an absolute value circuit 502, an averaging circuit 503 and a comparator circuit 504, and outputs a 1-bit digital signal. The threshold value of the comparator 504 is appropriately selected whereby the output signal thereof can be used as a flag for deciding the quality.

Each of absolute value circuits 302, 402, 502 in FIGS. 12, 13, 14 may be replaced by a square circuit with equal effect.

According to the present invention, the degree of data accuracy including the identification characteristics of a Viterbi detector of a magnetic recording and reproduction apparatus can be easily evaluated, thereby making it possible to easily evaluate the dependency of the degree of data accuracy on the recording-reproduction channel parameters of the apparatus.

What is claimed is:

1. A data error rate measuring method comprising the steps of:

setting a first equalization coefficient value of a wave form equalizer at a first value which results in a first output wave form of the wave form equalizer;

carrying out first data read tests in accordance with the first output wave form;

detecting errors in the first tests;

counting a number of errors generated in the first tests;

setting a second equalization coefficient value of the wave form equalizer at a second value which results in a second output wave form of the wave form equalizer;

carrying out second data read tests in accordance with the second output wave form;

detecting errors in the second tests;

counting a number of errors generated in the second tests; and estimating an inherent data error rate from a relation between each equalization coefficient value and a number of errors associated therewith in each respective counting step;

wherein the inherent data error rate is estimated by extending a first curve and a second curve; wherein
said first curve is obtained by data errors generated in the first tests; and
said second curve is obtained by data errors generated in the second tests.

* * * * *